United States Patent [19]

Kato et al.

[11] 4,274,517
[45] Jun. 23, 1981

[54] HYDRAULIC SHOCK ABSORBER

[75] Inventors: Tetuo Kato, Musashino; Ieaki Miura, Yokohama, both of Japan

[73] Assignee: Tokico, Ltd., Kawasaki, Japan

[21] Appl. No.: 25,745

[22] Filed: Mar. 30, 1979

[30] Foreign Application Priority Data

Apr. 1, 1978 [JP] Japan .............................. 53-42874[U]

[51] Int. Cl.³ ............................................ F16F 9/36
[52] U.S. Cl. .................................... 188/315; 188/322;
222/402.16; 267/64 R; 267/126
[58] Field of Search ........................ 188/315, 322, 269;
267/64 R, 126; 222/402.16

[56] References Cited

U.S. PATENT DOCUMENTS

| 4,015,757 | 4/1977 | Meuresch et al. | 222/402.16 |
| 4,108,287 | 8/1978 | Kato | 188/315 |
| 4,114,866 | 9/1978 | Kato | 188/322 X |

FOREIGN PATENT DOCUMENTS 47-3211 2/1972 Japan .

Primary Examiner—George E. A. Halvosa
Attorney, Agent, or Firm—Wenderoth, Lind & Ponack

[57] ABSTRACT

A hydraulic shock absorber of the type including a tubular main body having of an inner tube containing oil and slidably receiving a piston and an outer tube surrounding the inner tube to define around the inner tube an annular reservoir chamber containing therein pressurized gas in the upper portion and oil in the lower portion. A rod guide closes the upper end of the inner tube, and a piston rod is secured to the piston and slidably extends through the rod guide and through a seal member closing the upper end of the main body. A spring is disposed between the rod guide and the seal member and acts on the seal member through an annular retainer to urge the seal member against the inner surface of the main body, wherein, there are mounted on the annular retainer an annular valve member having a lip portion for engaging with the rod guide to prevent fluid flow from the upper portion of the reservoir chamber to the interior of the inner tube through a clearance between the rod guide and the piston rod but allowing fluid flow in the opposite direction. An annular valve member is provided having a lip portion engaging with the inner surface of the main body to prevent fluid flow from the interior of the main body to the outside of the main body along the inner surface of the main body but allowing fluid flow in the opposite direction.

3 Claims, 2 Drawing Figures

U.S. Patent  Jun. 23, 1981  4,274,517
Fig. 1
Fig. 2
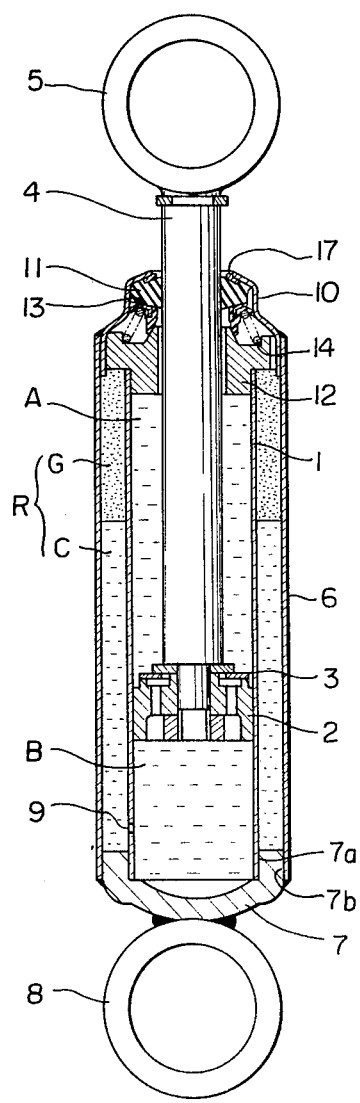
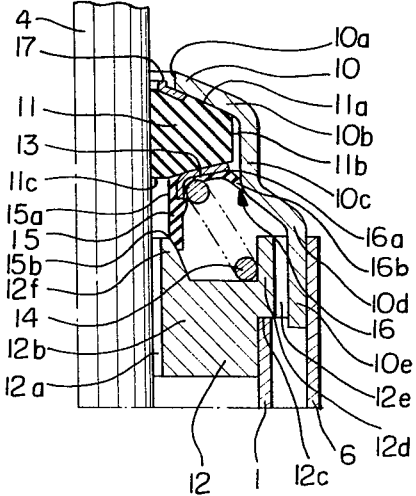

HYDRAULIC SHOCK ABSORBER

This invention relates to hydraulic shock absorbers of the gas enclosed type wherein liquid and pressurized gas are enclosed in a tubular main body and a piston rod projects out of the main body through a seal member disposed at one end of the main body. More particularly, the present invention relates to dual tube type hydraulic shock absorbers of the type including a tubular main body having an inner tube containing liquid therein and an outer tube surrounding the inner tube to define therebetween a reservoir chamber containing gas in the upper portion thereof and liquid in the lower portion thereof, a piston working in the inner tube and having a damping force generating mechanism, a piston rod connected to the piston and being guided through one end of the tubular main body by a rod guide which is disposed at one end of the tubular main body, a passage placing the liquid in the reservoir chamber in communication with liquid in a chamber in the inner tube and below the piston, and a seal member slidably fitted on the piston rod to seal the clearance between the piston rod and the tubular main body.

Various proposals have been made for filling pressurized gas into hydraulic shock absorbers of the gas enclosed type and, according to one prior art method, the seal member disposed at one end of the main body and sealingly engaging with the piston rod is displaced inwardly when filling pressurized gas into the main body to form a gas filling passage between the inner surface of the main body and the outer surface of the seal member and, thereafter, the seal member is displaced outwardly thereby engaging tightly with the main body. However, when the seal member contacts the inner surface of the main body with a relatively large area the unit sealing force will be relatively low and, when a lip portion is formed on the outer surface of the seal member to tightly engage with the main body so as to act as a check valve, as shown in Japanese Utility Model Publication No. 3211/1972, it is very difficult to obtain the desired sealing characteristics both at the lip portion engaging with the wall of the main body (static seal) and at a lip portion engaging with the piston rod (dynamic seal) and, further, the movement of the seal member accompanying the movement of the piston rod will cause deterioration of the sealing characteristics of the lip portion engaging with the wall of the main body.

In dual tube type hydraulic shock absorbers of the type aforementioned, air will sometimes be collected in the inner tube when operating the shock absorber due to the so-called "aeration phenomenon" or a phenomenon wherein small air bubbles mix into the oil and thereafter separate from the oil. Such air must be returned to the reservoir chamber defined between the inner and the outer tubes and, further, the pressure in the reservoir chamber will become higher than that in the chamber at the upper portion of the inner tube in the contraction stroke of the shock absorber, so that it is necessary to prevent the flow of air from the reservoir chamber to the upper portion of the chamber in the inner tube.

An object of the present invention is to provide a dual tube type hydraulic shock absorber of the aforementioned type satisfying the requirements aforementioned and solving the problems aforementioned. According to the present invention the dual tube type hydraulic shock absorbers of the aforementioned type further comprise a spring acting on the lower end of the seal member through a retainer to urge the seal member against the inner surface of the tubular main body, a valve member being supported on the retainer and having a valve portion cooperating with the rod guide to permit fluid flow only in the direction from the chamber defined in the inner tube and above the piston to the reservoir chamber, and a valve member supported on the retainer and having a valve portion cooperating with the inner surface of the tubular main body to permit fluid flow only in the direction from the outside of the tubular main body to the interior of the tubular main body.

Further objects and avantages of the present invention will become apparent from the following detailed description taken in conjunction with the accompanying drawings, in which:

FIG. 1 is a longitudinal section of a hydraulic shock absorber exemplifying the present invention; and FIG. 2 is an enlarged partial view of FIG. 1.

The hydraulic shock absorber shown in the drawings comprises a tubular main body of the dual tube type including an inner tube 1 and an outer tube 6. A piston 2 is slidably fitted in the inner tube 1 thus dividing the interior of the inner tube 1 into an upper chamber A and a lower chamber B. A disc valve 3 acting as a damping force generating mechanism in the extension and contraction strokes of the shock absorber is mounted on the piston 2. A piston rod 4 is connected to the piston 2 and, extends upwards through the upper chamber A, a rod guide 12 and a seal member 11 to the outside of the shock absorber and has a mounting ring 5 on the outer end thereof. The outer tube 6 coaxially surrounds the inner tube 1 to define around the outer circumference of the inner tube 1 an annular reservoir chamber R consisting of an oil chamber C and a gas chamber G. The chambers A, B and C are filled with oil and the chamber G is filled with pressurized gas or air. The lower ends of the inner and outer tubes 1 and 6 are closed by a bottom cap 7 having a mounting ring 8 welded or secured thereto.

A passage or an opening 9 is formed in the lower portion of the inner tube 1 to permanently connecting the chambers B and C. The cross-sectional area of the opening 9 may be determined as desired and in association with the pressure of the gas filled in the gas chamber G.

A cap 10 secured to the upper end of the outer tube 1 closes the upper end of the tubular main body and has an opening 10a, a first tapered portion 10b, a first cylindrical portion 10c, a second tapered portion 10d, and a second cylindrical portion 10e as shown in FIG. 2. The outer circumference of the second cylindrical portion 10e engages and is secured to the inner circumference of the upper end of the outer tube 1.

The seal member 11 is slidingly fitted around the piston rod 4, and the upper end surface 11a thereof sealingly engages with the first tapered portion 10b of the cap 10. One or more axial grooves 11b are formed in the outer circumference of the seal member 11 for acting as gas introducing passages when the seal member 11 is displaced inwardly or downwardly in FIG. 2, when filling gas into the shock absorber.

The rod guide 12 has a guide bore 12a at the central portion thereof for slidingly engaging with and guiding the piston rod 4, a small diameter portion 12b fitted in the inner circumference of the upper end of the inner tube 1, a large diameter portion 12d fitted in the inner circumference of the outer tube 6 or the second cylindrical portion 10e of the cap 10, a radial shoulder 12c defined between the large and small diameter portions 12b and 12d for engaging with the upper end of the inner tube 1, and one or more axially extending grooves 12e formed in the outer circumference of the large diameter portion 12d. Further, a frusto-conical projection 12f is formed on the upper end of the rod guide 12 for cooperating with a valve portion 15b of a valve member 15 which will be described hereinafter.

An annular retainer 13 abuts the lower end surface 11c of the seal member 11. A downwardly extending small flange is formed on the radially inner end of the retainer 13 and the outer circumference of the retainer 13 is spaced from the inner circumference of the first cylindrical portion 10c of the cap 10 to define a small clearance therebetween. A coil spring 14 acts between the rod guide 12 and the retainer 13 to upwardly urge the seal member 11 upwardly so that the upper end surface 11a of the seal member 11 is normally pressed against the first tapered portion 10b of the cap 10.

The valve member 15 is an annular member formed of a resilient material, and a thick portion 15a thereof defining the base portion is secured to the inner circumference of the retainer 13 by baking or the like and the valve portion 15b having a small thickness and having a lip thereon extends downwardly from the base portion 15a to engage unit or seat on the projection 12f of the rod guide 12. The valve member 15 allows fluid flow from the chamber A to the chamber G and prevents fluid flow in the opposite direction.

An annular valve member 16 formed of a resilient material is also mounted on the retainer 13 with the base portion 16a of the valve member 16 being secured to the outer circumferential portion of the retainer 13 by baking or the like and, a valve portion 16b extending from the base portion 16a. The valve portion 16b cooperates with the inner surface of the first cylindrical portion 10c of the cap 10 for allowing gas flow from the outside of the tubular main body to the interior thereof when the seal member 11 is displaced downwardly and gas under pressure is forcibly introduced into the main body, but preventing gas flow in the opposite direction.

In the embodiment, the valve portion 16b of the valve member 16 sealingly engages with a bent portion defined between the first cylindrical portion 10c and the second tapered portion 10d, but the valve portion 16b may engage any desired surface portion facing the interior of the tubular main body such as the inner surface of the first cylindrical portion 10c or the second tapered surface 10d. Further, in the embodiment, the valve member 15 and the valve member 16 are integrally formed on the retainer 13 but the valve members 15 and 16 may be formed separately.

A washer or a plate 17 is embedded in the upper surface 11a of the seal member 11, so that the engagement between the upper surface 11a of the seal member 11 and the inner surface of the first tapered portion 10a of the cap 10 will not be hindered.

The function and advantages of the hydraulic shock absorber will now be explained.

When filling gas into the hydraulic shock absorber, the upper end portion of the shock absorber is located in a gas chamber of a gas filling apparatus (not shown) and a pressing force is applied on the plate 17 so as to displace the seal member 11 downwardly against the force of the spring 14, thereby forming a passage along the inner surface of the cap 10. Gas under pressure in the gas chamber is introduced into the reservoir chamber R. When a predetermined amount of gas has been introduced into the shock absorber, the pressing force applied on the plate 17 is released, and the seal member 11 then returns to its original position under the force of the spring 14 with the upper end surface 11a abutting the inner surface of the first tapered portion 10b of the cap 10. When the gas filling operation has been completed, the gas filling apparatus is removed from the shock absorber.

Normally, the high pressure gas filled in the gas chamber G acts on the lower surface of the seal member 11 to tightly press the upper surface 11a of the seal member 11 against the first tapered portion 10b of the cap 10 to maintain the sealed condition of the shock absorber. However, the sealing engagement between the relatively large area portion of the upper surface 11a of the seal member 11 and the generally flat surface portion of the tapered portion 10a is not completely reliable and a small leakage will sometimes be observed in the prior art shock absorbers and, further, the sliding resistance between the piston rod 4 and the seal member 11 may accidentally be increased such that the seal member may be displaced inwardly by the reciprocating movement of the piston rod 4 thus destroying the sealing engagement between the upper surface 11a of the seal member 11 and the first tapered portion 10b of the cap 10.

According to the present invention there is provided the valve member 16 having a valve portion 16b engaging with the inner surface of the main body to prevent the leakage of gas between the upper surface 11a of the seal member 10 and the first tapered portion 10b of the cap 10 thereby providing so-called dual safety. Preferably, the valve portion 16b engages with the inner surface of the cap 10 with a predetermined initial deflection so that even though the seal member 11 has been displaced inwardly by a small amount a reliable sealing engagement can be maintained between the valve portion 16b of the valve member 16 and the inner surface of the cap 10. Further, the pressure of the gas in the shock absorber acts to deflect the valve portion 16b of the valve member 16 upwardly so as to tightly press the valve portion 16b against the inner surface of the cap 10, whereby the leakage of gas can reliably be prevented.

The valve member 15 is disposed in a passage connecting the chamber A with the gas chamber G, so that air bubbles which may be generated in the chamber A or in the chamber B during operation of the shock absorber will reliably egress into the gas chamber G during the extension stroke of the shock absorber by separating the valve member 15 from the rod guide 12. On the contrary, the gas in the gas chamber G can not ingress into the oil chamber A, whereby the desired damping force characteristics of the hydraulic shock absorber can be assured.

Since the valve members 15 and 16 are fabricated separately from the seal member 11, the valve members 15 and 16 can be formed of a material different from that of the seal member 11, so that the respective members can be formed to have the most suitable sealing characteristics and, further, a small movement or deflection of the seal member 11 which may accompany the reciprocating movement of the piston rod 4 will not impede the sealing characteristics of the valve members 15 and 16.

What is claimed is:

1. A double tube type hydraulic shock absorber comprising:
an inner cylinder filled with a working fluid and an outer cylinder surrounding said inner cylinder and defining an annular reservoir chamber with said inner cylinder, the lower portion of said reservoir chamber being filled with working fluid and the upper portion of said reservoir chamber being filled with pressurized gas, a piston slidable within the inner cylinder and having a piston rod thereon protruding from one end of the inner cylinder, a piston rod guide closing said one end of the inner cylinder and having a valve seat thereon, said piston rod being spaced from said rod guide for defining therebetween a passage for connecting the inner cylinder with the reservoir chamber, a cap closing the one end of said outer cylinder, a seal member spaced outwardly along said piston rod from said rod guide, a spring loaded annular retaining plate acting on the lower side of said seal member for urging said seal member against the inner surface of said cap, said seal member being slidable along the piston rod toward the interior of the cylinder against the action of said retaining plate for forming a gas filling inlet between the inner surface of said cap and the outer surface of said seal member, a non-return valve having a lip-like valve member and being firmly attached to the annular retaining plate and said lip-like valve member being resiliently urged against the valve seat on the rod guide for permitting flow of gas from said passage and blocking flow of gas in the opposite direction, and a further valve member for further sealing said gas filling inlet, said further valve member being secured to said annular retaining plate on the opposite face of said retaining plate from said seal member at or close to the outer periphery thereof and having a resilient lip extending beyond the outer periphery of said retaining plate and abutting the inner surface of said cap and curving away from said seal member for permitting flow of gas from said gas inlet into said outer cylinder and blocking flow of gas in the opposite direction.

2. A shock absorber as claimed in claim 1 in which said further valve member has a base portion integral with said first mentioned valve member, said base portion being firmly connected to said retaining plate.

3. A shock absorber as claimed in claim 1 in which said cap has an inner shoulder between portions of different diameter, and said lip on said further valve member engages said inner shoulder in sealing relationship.

* * * * *